(12) United States Patent
Yoshida et al.

(10) Patent No.: US 7,599,904 B2
(45) Date of Patent: Oct. 6, 2009

(54) INFORMATION ANALYSIS APPARATUS, INFORMATION ANALYSIS METHOD, AND INFORMATION ANALYSIS PROGRAM

(75) Inventors: Naofumi Yoshida, Kanagawa (JP); Jun Miyazaki, Kanagawa (JP)

(73) Assignee: Fuji Xerox Co. Ltd., Tokyo (JP)

( * ) Notice: Subject to any disclaimer, the term of this patent is extended or adjusted under 35 U.S.C. 154(b) by 362 days.

(21) Appl. No.: 11/206,797

(22) Filed: Aug. 19, 2005

(65) Prior Publication Data

US 2006/0184501 A1 Aug. 17, 2006

(30) Foreign Application Priority Data

Feb. 17, 2005 (JP) .............................. 2005-040667

(51) Int. Cl.
*G06F 17/30* (2006.01)
(52) U.S. Cl. .................... 707/1; 707/6; 707/7; 707/10
(58) Field of Classification Search ..................... 707/6
See application file for complete search history.

(56) References Cited

U.S. PATENT DOCUMENTS

| 5,826,263 | A | * | 10/1998 | Nakabayashi et al. ........... 707/7 |
| 6,675,164 | B2 | * | 1/2004 | Kamath et al. .................. 707/6 |
| 6,816,853 | B1 | * | 11/2004 | Agarwal et al. ................. 707/3 |
| 2002/0059191 | A1 | * | 5/2002 | Tamura ........................ 707/2 |
| 2002/0059273 | A1 | * | 5/2002 | Morimoto et al. ........... 707/100 |
| 2002/0091697 | A1 | * | 7/2002 | Huang et al. .................. 707/10 |
| 2002/0143490 | A1 | * | 10/2002 | Maeda et al. ................ 702/150 |
| 2003/0154480 | A1 | * | 8/2003 | Goldthwaite et al. .......... 725/46 |
| 2003/0217055 | A1 | * | 11/2003 | Lee et al. ........................ 707/6 |
| 2003/0236785 | A1 | * | 12/2003 | Shintani et al. ................. 707/6 |
| 2004/0064450 | A1 | * | 4/2004 | Hatano et al. ................... 707/6 |
| 2004/0111433 | A1 | * | 6/2004 | Seto et al. ................. 707/104.1 |
| 2004/0267751 | A1 | * | 12/2004 | Dill et al. ....................... 707/9 |
| 2005/0024513 | A1 | * | 2/2005 | Hayashi et al. ......... 348/333.01 |
| 2005/0159835 | A1 | * | 7/2005 | Yamada et al. .............. 700/109 |

FOREIGN PATENT DOCUMENTS

JP 2001-344259 A 12/2001

OTHER PUBLICATIONS

R.J. Brachman et al.; "Mining Business Databases"; Communication of the ACM; vol. 39; No. 11; Nov. 1996; pp. 42-48.
Rakesh Agrawal et al.; "Mining Association Rules Between Sets of Items in Large Databases"; Proc of ACM SIGMOD; 1993; pp. 207-216.
Rakesh Agrawal et al.; "Fast Algorithms for Mining Association Rules"; Proc of VLDB; 1994; pp. 487-499.

* cited by examiner

*Primary Examiner*—Wilson Lee
*Assistant Examiner*—Binh V Ho
(74) *Attorney, Agent, or Firm*—Sughrue Mion, PLLC

(57) ABSTRACT

There is provided an information analysis apparatus comprising first and second data mining portions. The first mining portion conducts data mining of a first data group and counts numbers of data obtained in process of the data mining of the first data group. The second mining portion conducts the data mining of a second data group, counts the numbers of data obtained in process of the data mining of the second data group, and further conducts the data mining of the first and second data groups, on the basis of the numbers of data obtained by the first and second mining portions. The second data group is generated continuously after the first data group.

18 Claims, 9 Drawing Sheets

| Rule ID | Person ID | Position | Time | Event1 | Event2 |
|---|---|---|---|---|---|
| 1001 | personA | 100,100 | 2004/10/11 14:31:23 | Voice:normal | Behavior:none |
| 1002 | personB | 110,100 | 2004/10/11 14:31:23 | Voice:normal | Behavior:none |
| 1003 | personC | 120,100 | 2004/10/11 14:31:23 | Voice:normal | Behavior:none |
| 1007 | personA | 100,100 | 2004/10/11 14:31:24 | Voice:loud | Behavior:point to figure |
| 1008 | personB | 110,100 | 2004/10/11 14:31:24 | Voice:normal | Behavior:none |
| 1009 | personC | 120,100 | 2004/10/11 14:31:24 | Voice:normal | Behavior:none |
| ... | | | | | |

| Rule ID | Person ID | Position | Time | Event1 | Event2 |
|---|---|---|---|---|---|
| 1001 | personA | 100.100 | 2004/10/11 14:31:23 | Voice:normal | Behavior:none |
| 1002 | personB | 110.100 | 2004/10/11 14:31:23 | Voice:normal | Behavior:none |
| 1003 | personC | 120.100 | 2004/10/11 14:31:23 | Voice:normal | Behavior:none |
| 1004 | personA | 100.100 | 2004/10/11 14:31:24 | Voice:loud | Behavior:point to figure |
| 1005 | personB | 110.100 | 2004/10/11 14:31:24 | Voice:normal | Behavior:none |
| 1006 | personC | 120.100 | 2004/10/11 14:31:24 | Voice:normal | Behavior:none |
| ... | | | | | |
| 2001 | personA | 100.100 | 2004/10/11 15:01:41 | Voice:loud | Behavior:point to figure |
| 2002 | personB | 110.100 | 2004/10/11 15:01:41 | Voice:normal | Behavior:none |
| 2003 | personC | 120.100 | 2004/10/11 15:01:41 | Voice:normal | Behavior:none |
| 2004 | personA | 100.100 | 2004/10/11 15:01:42 | Voice:loud | Behavior:point to figure |
| 2005 | personB | 110.100 | 2004/10/11 15:01:42 | Voice:normal | Behavior:none |
| 2006 | personC | 120.100 | 2004/10/11 15:01:42 | Voice:normal | Behavior:none |
| ... | | | | | |

| attribute | item | count |
|---|---|---|
| * | * | 5400 |
| Person ID | personA | 1800 |
| Person ID | personB | 1800 |
| Person ID | personC | 1800 |
| Posidion | 100,100 | 1800 |
| ... | ... | ... |
| Person ID,posidion | personA,100.100 | 1500 |
| Person ID,posidion | personA,100.105 | 200 |
| Person ID,posidion | personA,100.110 | 100 |
| Person ID,posidion | personB,110.100 | 1800 |
| ... | ... | ... |
| Person ID,Event1,Event2 | personA,Voice:normal,Behavior:none | 950 |
| Person ID,Event1,Event2 | personA,Voice:loud,Behavior:none | 20 |
| Person ID,Event1,Event2 | personA,Voice:normal,Behavior:point to figure | 30 |
| Person ID,Event1,Event2 | personA,Voice:loud,Behavior:point to figure | 800 |
| ... | | |

| C1 | C2 | Support (C1) | Confidence (C1,C2) |
|---|---|---|---|
| Person ID=personA | Person ID=personA, Posidion=100.100 | 33% (=1800/5400) | 83% (=1500/1800) |
| Person ID=personA | Person ID=personA, Posidion=100.105 | 33% (=1800/5400) | 11% (=200/1800) |
| Person ID=personA | Person ID=personA, Posidion=100.110 | 33% (=1800/5400) | 5.6% (=100/1800) |
| ... | ... | ... | ... |
| Person ID=personA, Event1=Voice:normal | Person ID=personA, Event1=Voice:normal, Event2=Behavior:none | 18% (=980/5400) | 97% (=950/980) |
| Person ID=personA, Event1=Voice:roud | Person ID=personA, Event1=Voice:roud, Event2=Behavior:point to figure | 15% (=820/5400) | 98% (=800/820) |
| ... | ... | ... | ... |

| Rule ID | Person ID | Position | Time | Event1 | Event2 |
|---------|-----------|----------|------|--------|--------|
| 2501 | personA | 100.100 | 2004/10/11 15:11:00 | Voice:loud | Behavior:point to figure |
| 2502 | personB | 110.100 | 2004/10/11 15:11:00 | Voice:normal | Behavior:none |
| 2503 | personC | 120.100 | 2004/10/11 15:11:00 | Voice:normal | Behavior:none |

| | Rule ID | Person ID | Position | Time | Event1 | Event2 |
|---|---------|-----------|----------|------|--------|--------|
| | 1001 | personA | 100.100 | 2004/10/11 14:31:23 | Voice:normal | Behavior:none |
| | 1002 | personB | 110.100 | 2004/10/11 14:31:23 | Voice:normal | Behavior:none |
| | 1003 | personC | 120.100 | 2004/10/11 14:31:23 | Voice:normal | Behavior:none |
| | 1004 | personA | 100.100 | 2004/10/11 14:31:24 | Voice:loud | Behavior:point to figure |
| | 1005 | personB | 110.100 | 2004/10/11 14:31:24 | Voice:normal | Behavior:none |
| | 1006 | personC | 120.100 | 2004/10/11 14:31:24 | Voice:normal | Behavior:none |
| | ... | | | | | |
| | 2001 | personA | 100.100 | 2004/10/11 15:01:41 | Voice:loud | Behavior:point to figure |
| | 2002 | personB | 110.100 | 2004/10/11 15:01:41 | Voice:normal | Behavior:none |
| | 2003 | personC | 120.100 | 2004/10/11 15:01:41 | Voice:normal | Behavior:none |
| | 2004 | personA | 100.100 | 2004/10/11 15:01:42 | Voice:loud | Behavior:point to figure |
| | 2005 | personB | 110.100 | 2004/10/11 15:01:42 | Voice:normal | Behavior:none |
| | 2006 | personC | 120.100 | 2004/10/11 15:01:42 | Voice:normal | Behavior:none |
| | ... | | | | | |
| * | 2501 | personA | 100.100 | 2004/10/11 15:11:00 | Voice:loud | Behavior:point to figure |
| * | 2502 | personB | 110.100 | 2004/10/11 15:11:00 | Voice:normal | Behavior:none |
| * | 2503 | personC | 120.100 | 2004/10/11 15:11:00 | Voice:normal | Behavior:none |

| C1 | C2 | Support (C1) | Confidence (C1,C2) |
|---|---|---|---|
| Person ID=personA | Person ID=personA, Posidion=100.100 | 33% (=1801/5401) | 83% (=1500/1801) |
| Person ID=personA | Person ID=personA, Posidion=100.105 | 33% (=1801/5401) | 11% (=200/1801) |
| Person ID=personA | Person ID=personA, Posidion=100.110 | 33% (=1801/5401) | 5.6% (=100/1801) |
| ... | ... | ... | ... |
| Person ID=personA, Event1=Voice:normal | Person ID=personA, Event1=Voice:normal, Event2=Behavior:none | 18% (=980/540) | 97% (=950/980) |
| Person ID=personA, Event1=Voice:roud | Person ID=personA, Event1=Voice:roud, Event2=Behavior:point to figure | 15% (=821/5401) | 98% (=801/821) |
| ... | ... | ... | ... |

FIG. 12

| attribute | item | count |
|---|---|---|
| * | * | 5401 * |
| Person ID | personA | 1800 |
| Person ID | personB | 1800 |
| Person ID | personC | 1800 |
| Posidion | 100,100 | 1800 |
| ... | ... | ... |
| Person ID,posidion | personA,100.100 | 1500 |
| Person ID,posidion | personA,100.105 | 200 |
| Person ID,posidion | personA,100.110 | 100 |
| Person ID,posidion | personB,110.100 | 1800 |
| ... | ... | ... |
| Person ID,Event1,Event2 | personA,Voice:normal,Behavior:none | 950 |
| Person ID,Event1,Event2 | personA,Voice:loud,Behavior:none | 20 |
| Person ID,Event1,Event2 | personA,Voice:normal,Behavior:point to figure | 30 |
| Person ID,Event1,Event2 | personA,Voice:loud,Behavior:point to figure | 801 * |
| ... | | |

INFORMATION ANALYSIS APPARATUS, INFORMATION ANALYSIS METHOD, AND INFORMATION ANALYSIS PROGRAM

BACKGROUND OF THE INVENTION

1. Field of the Invention

This invention relates to an information analysis apparatus, information analysis method, and information analysis program.

2. Description of the Related Art

Conventionally, the data mining with the use of an association rule mining has been proposed as a technique for extracting the knowledge from the database. The purpose to utilize the data mining is to find unexpected patterns from a huge quantity of data. The conventional techniques related to the data mining have been proposed as follows.

An information analysis apparatus described in Japanese Patent Application Publication No. 2001-344259 (hereinafter referred to as Document 1) stores the data mining results of the past to extract the association rules. At the time of adding or deleting the data, the data mining results of the past are verified with the data to be added without accessing the database of the past. The data mining of the whole data is conducted by combining the verified result of the data mining of the past and the data to be added with the data mining result of the data to be added. This accelerates the data mining at the time of adding or deleting the data.

Additionally, the following three non-patent documents (Documents 2 through 4) have been proposed, as the fundamental techniques of the data mining.

Document 2: Brachman, R. J., Khabaza, T., Kloesgen, W., Piatetsky-Shapiro, G. and Simoudis, E.: Mining Business Databases, Communications of the ACM, Vol. 39, No. 11, pp. 42-48, November 1996

Document 3: Agrawal, R., Imielinski, T., Swami, A.: "Mining Association Rules between Sets of Items in Large Databases", Proc. of ACM SIGMOD, pp. 207-216, 1993 Document 4: Agrawal, R., Srikant, R.: Fast Algorithms for Mining Association Rules, Proc. of VLDB, pp. 487-499 (1994)

It is to be noted that the information analysis apparatus as disclosed in Document 1 employs the method for simply combining the data mining result of the added data, according to the verified result. With this method, the data mining result of the past cannot be used without modification, under the condition that the data are generated from multiple cameras and microphones continuously or in synchronization with one another. This causes a problem in that the whole data mining cannot be conducted.

SUMMARY OF THE INVENTION

The present invention has been made in view of the above circumstances and provides an information analysis apparatus, information analysis method, and information analysis program, with which groups of data being generated continuously and in synchronization can be effectively analyzed.

According to one aspect of the present invention, there may be provided an information analysis apparatus comprising first and second data mining portions, the first mining portion conducting data mining of a first data group and counting numbers of data obtained in process of the data mining of the first data group, the second mining portion conducting the data mining of a second data group, counting the numbers of data obtained in process of the data mining of the second data group, and further conducting the data mining of the first and second data groups, on the basis of the numbers of data obtained by the first and second mining portions, the second data group being generated continuously after the first data group. The information analysis apparatus according to the present invention conducts data mining of the first and second groups with the use of the data mining the number of the data necessary for the future data mining, and does not have to search all the number of data included in the databases for the first and the second group of data. This enables to count the numbers rapidly and obtain an analysis result rapidly at a minimum period of the multiple data being generated and in synchronization.

According to another aspect of the present invention, there may be provided an information analysis method including conducting data mining of a first data group and counting numbers of data obtained in process of the data mining of the first data group, and conducting the data mining of a second data group, counting the numbers of data obtained in process of the data mining of the second data group, and further conducting the data mining of the first and second data groups, on the basis of the numbers of data obtained by the first and second mining portions. The second data group may be generated continuously after the first data group.

According to another aspect of the present invention, there may be provided a storage medium readable by a computer, the storage medium storing a program of instructions executable by the computer to perform a function for data mining, the function including conducting data mining of a first data group and counting numbers of data obtained in process of the data mining of the first data group, and conducting the data mining of a second data group, counting the numbers of data obtained in process of the data mining of the second data group, and further conducting the data mining of the first and second data groups, on the basis of the numbers of data obtained by the first and second mining portions. The second data group may be generated continuously after the first data group.

BRIEF DESCRIPTION OF THE DRAWINGS

Embodiments of the present invention will be described in detail based on the following figures, wherein:

FIG. 5 shows a content of a database 6;

FIG. 6 shows a content of a database 7;

FIG. 7 shows a content of a database 9;

FIG. 8 shows an output example of an initial data mining portion 8;

FIG. 9 shows an example of the database 6 just after a last half of the conference starts;

FIG. 10 shows another content of the database 7;

FIG. 11 shows an output example of an incremental data mining portion 10; and FIG. 12 shows another content of the database 9.

DESCRIPTION OF THE EMBODIMENTS

A description will now be given, with reference to the accompanying drawings, of embodiments of the present invention.

Figure 1:
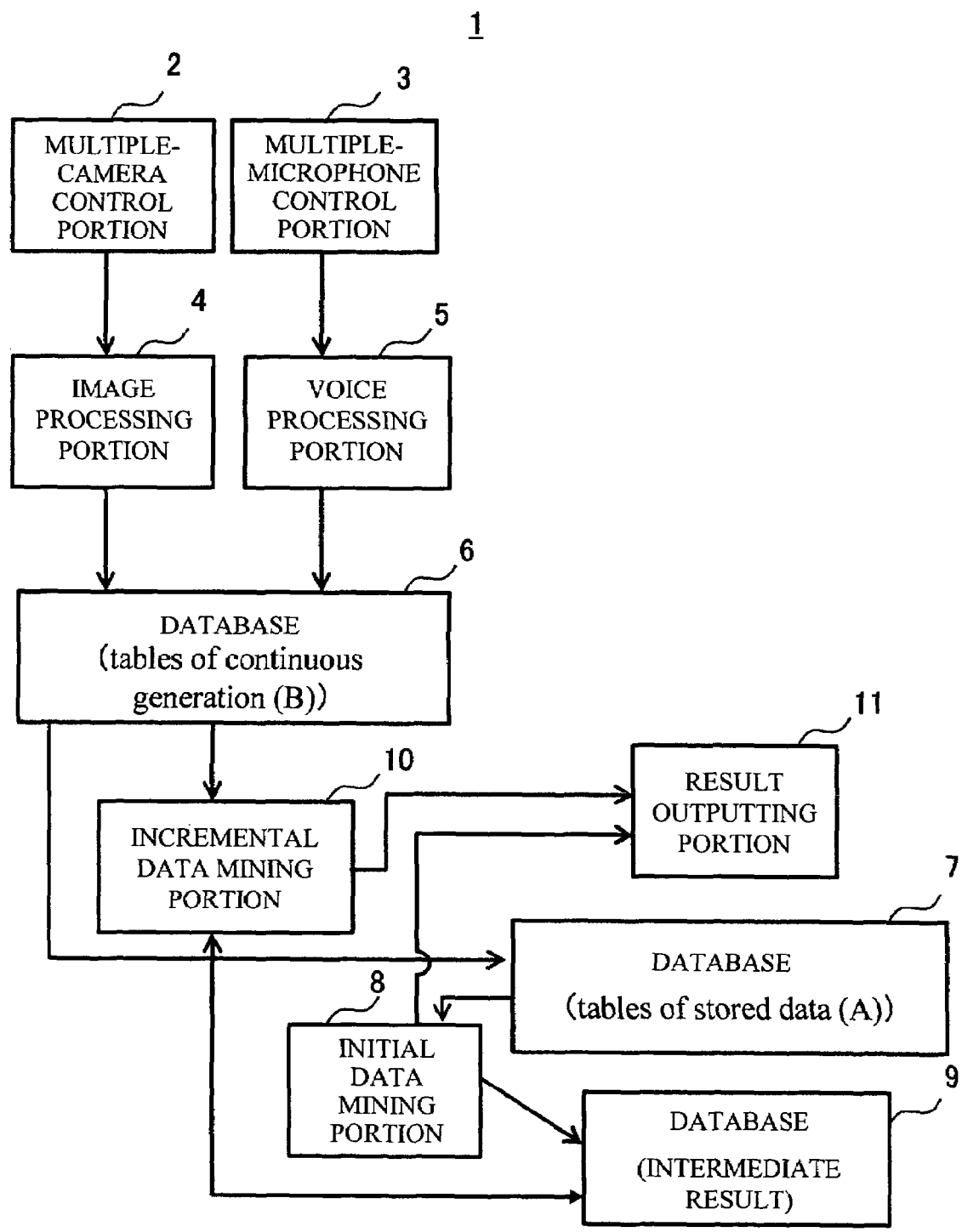
FIG. 1 is a block diagram of an information analysis apparatus embodying the invention.
Figure 2:
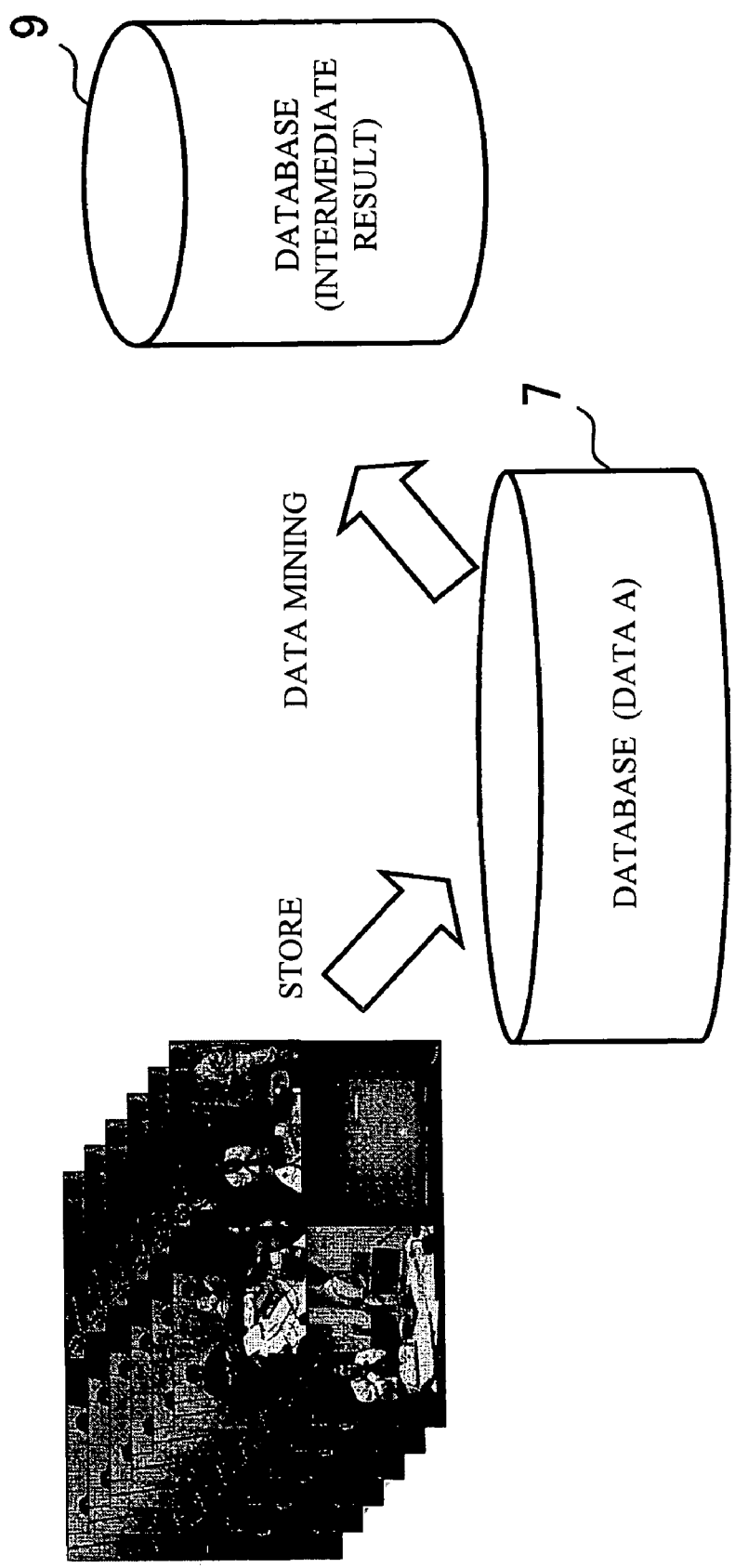
FIG. 2 is a view illustrating a creation process of an intermediate result done by the information analysis apparatus embodying the invention.
Figure 3:
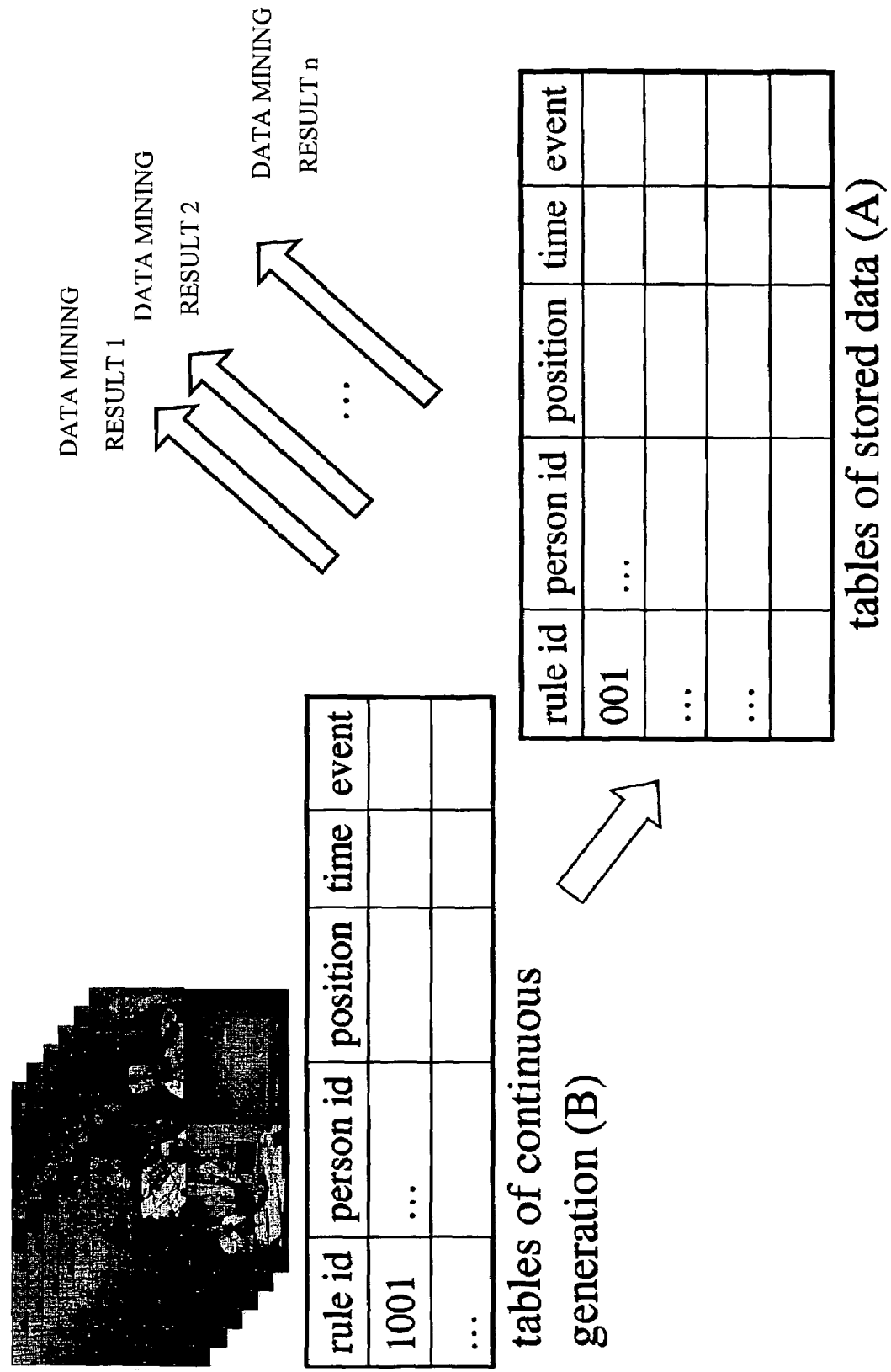
FIG. 3 is a view illustrating an incremental data mining done by the information analysis apparatus embodying the invention.

FIG. 1 is a block diagram of an information analysis apparatus 1 in accordance with an embodiment of the present invention. FIG. 2 is a view illustrating a creation process of an intermediate result done by the information analysis apparatus 1. FIG. 3 is a view illustrating an incremental data mining conducted by the information analysis apparatus 1. Referring to FIG. 1, the information analysis apparatus 1 includes a multiple-camera control portion 2, a multiple-microphone control portion 3, an image processing portion 4, a voice processing portion 5, databases 6 and 7, an initial data mining portion 8, a database 9, an incremental data mining portion 10, and a result outputting portion 11.

The information analysis apparatus 1 is used for conducting data mining of the data generated continuously and in synchronization. The multiple-camera control portion 2 controls multiple cameras installed on a conference room, for example, in order to capture the data of moving images being generated from the multiple cameras continuously and in synchronization with one another. The multiple-microphone control portion 3 controls multiple microphones installed on a conference room, for example, in order to capture voice data being generated from the multiple microphones continuously and in synchronization with one another.

The image processing portion 4 and the voice processing portion 5 creates data B of the moving image and voice of a conference, with the use of the techniques of image processing and voice processing, on the basis of the data of moving images continuously input from the multiple cameras and the voice data continuously input from the multiple microphones. The data B includes events on the conference, each of which includes a person ID (person id), a position ID (position), a time, and an event. Specifically, The person ID is an ID for a person involved in the event. The position ID is a position of the person that corresponds to coordinates. The time is a time when the event occurred. The event is a content of the event.

The database 6 stores the data B in a table format (tables of continuous generation) as shown in FIG. 3. Each line in the database 6 denotes a transaction. In other words, the database 6 can be regarded as a group of transactions. Each transaction has a unique identifier named a rule ID (rule id) Items in each transaction are the person ID, the position ID, the time, and the event. That is to say, each transaction is composed of the items. By combining sets of items as required, so many association rules can be formed.

The image processing portion 4, for example, is capable of selecting a color of skin to highlight a face and arms of a person at the time of image processing. This enables to extract the fact that someone is sitting. Further, at the same time, the voice processing portion 5 extracts features of the voices to compare the extracted features with sample voices that have been recorded for every participant at the time of voice processing (for example, the wave form is extracted and compared with the use of a wavelet transform). With the recognition of the person and the multiple microphones, the position of the person can be identified with the difference of the voice generation timings. The data B is recorded for including every event (a person A is sitting) after combining the extracted information as the rule ID (appended exclusively), the person ID (an identifier of every person), the position ID (the coordinates of the conference room), and the time.

The database 7 stores tables of data A in a table format (tables of stored data), which are a group of the data B sequentially being generated, as shown in FIG. 2 and FIG. 3. Also in the database 7, each line denotes a transaction, same as the database 6. This means that the database 7 is a group of transactions. Each transaction has a unique identifier, the rule ID (rule id). There are the items including the person ID (person id), the position ID (position), the time (time), and the event (event). In other words, each transaction is composed of the items. By combining sets of items as required, so many association rules can be formed.

The initial data mining portion 8 counts the number of the data A obtained in the process of the data mining with the use of association rule extract algorithm, and stores the number of the data A in the database 9 as an intermediate result. Then, the number of the combinations of appeared data is also stored in the database 9 as the intermediate result. Here, the number of the data obtained in process of the data mining denotes the number of the same data appeared in the databases 6 and 7 in FIG. 1.

A description will now be given of the support and confidence of the association rule. On an association rule X=>Y, a left side X is known as antecedent and a right side Y is known as consequent. If the rate including X and Y in all the transactions in the database 7 is c percent, "the association rule X=>Y is realized with the confidence of c percent in the database 7". In addition, if s percent is the ratio of X or Y (X U Y) to all the transactions in the database 7, "the association rule X=>Y is realized with the support of s percent in the database 7". If the set of items that realize the association rule of a high value is already known, the confidence and support of the association rule will be able to be understood by a simple query into the database.

The conventional documents 2 through 4 have already proposed the association rule extracting algorithm. The SUPPORT (X) and CONFIDENCE ($C_1$, $C_2$) are defined as the following expressions, and if both the support and the confidence are high, this is adopted as the association rule.

$$\text{SUPPORT}(X) = \frac{\text{The number of data in the database that satisfies a condition } X}{\text{The number of all the data in the database}} \quad \text{[Expression 1]}$$

$$\text{CONFIDENCE}(C_1, C_2) = \frac{\text{SUPPORT}(C_1 \wedge C_2)}{\text{SUPPORT}(C_1)} \quad \text{[Expression 2]}$$

The initial data mining portion 8 applies the support and confidence in the expressions 1 and 2 to an arbitrary two attributes. For example, if the confidence is calculated with respect to the person ID and the event in the data A included in the table of the database 7 on a condition $C_1$ that the person ID is 0000 and another condition $C_2$ that the event is "sitting", it is possible to obtain the ratio of the event "sitting" and the person ID having 0000 in all the events. The ratio of an arbitrary event of an arbitrary person is obtainable by calculating all the combinations of the person IDs and the events.

Further, an arbitrary combination of an arbitrary attribute is obtainable, and accordingly, the ratios of every combination of the events to all the combinations in the database are obtainable. This increases the calculation amount. Then, threshold values are determined for the support and the confidence. If both the support and the confidence are high and exceed the threshold values, a frequently appearing pattern is adopted as a rule.

The database 9 stores the number of data obtained in process of data mining as the intermediate result. The incremental data mining portion 10 conducts data mining of the data B (a second data group) and the numbers of the data that have been counted (a first data group) in the initial data mining portion 8 for the purpose of data mining of the data A and the data B. As described, the data B is being generated continuously and in synchronization after the data A.

The incremental data mining portion 10 has capabilities of storing the number of data that satisfy the conditions as the intermediate result to calculate the support and confidence realized between arbitrary data and also has capabilities of calculating the differences.

Specifically, the initial data mining portion 8 stores the number of the data A necessary for calculation of the support and confidence in the database 7, as the intermediate result in the database 9. The initial data mining portion 8 stores every number of data, for example, how many times the data having the person ID of 0000 has appeared or the number of data having "sitting" in the event.

The association rule extracting algorithm utilized in the incremental data mining portion 10 is different from that of the initial data mining portion 8. The incremental data mining portion 10 refers to newly entered data and the intermediate result stored to count the numbers according to the item in the database 7. The incremental data mining portion 10 does not count all the data in the database 7. This is different from the initial data mining portion 8. The incremental data mining portion 10 calculates the support and confidence between arbitrary data with the expressions 1 and 2 as the initial data mining portion 8. However, the incremental data mining portion 10 is capable of extracting the frequently appearing pattern as a rule without accessing the database 7 to calculate the numbers or ratios of the items and the support and confidence with the expressions 1 and 2.

A process of storing the intermediate result with the initial data mining portion 8 and the incremental data mining portion 10 subsequently conducted is basically independent of another process of data mining only with the incremental data mining portion 10, enabling a parallel processing.

The result outputting portion 11 is composed, for example, of a display device or printer. The result outputting portion 11 outputs the rule obtained by the incremental data mining portion 10 as an analysis result. Here, a visualization method on the result outputting portion 11 includes, for example, a graph drawing method or a matrix display. With the graph drawing method, a group of association rules are basically expressed as a directed graph having the items set to nodes and the association rule set to a directed edge (arc).

The support and confidence in the association rule can be expressed with width (thickness) and color of the directed edge. For example, the confidence may be expressed with a color tone or color saturation changing from blue to red. The support may be expressed with the width of the directed edge. Next, the matrix display will be described. Assuming that there is a plane having the items arranged in horizontal and vertical axes. If one antecedent and one consequent in the association rule respectively include one item, the association rule can be displayed as a point on the plane having horizontal and vertical coordinates. The antecedent is positioned on the vertical axis and the consequent is positioned on the horizontal axis. The color (lightness, tone, and saturation) of the point may be able to express the confidence and support of the association rule.

Figure 4:
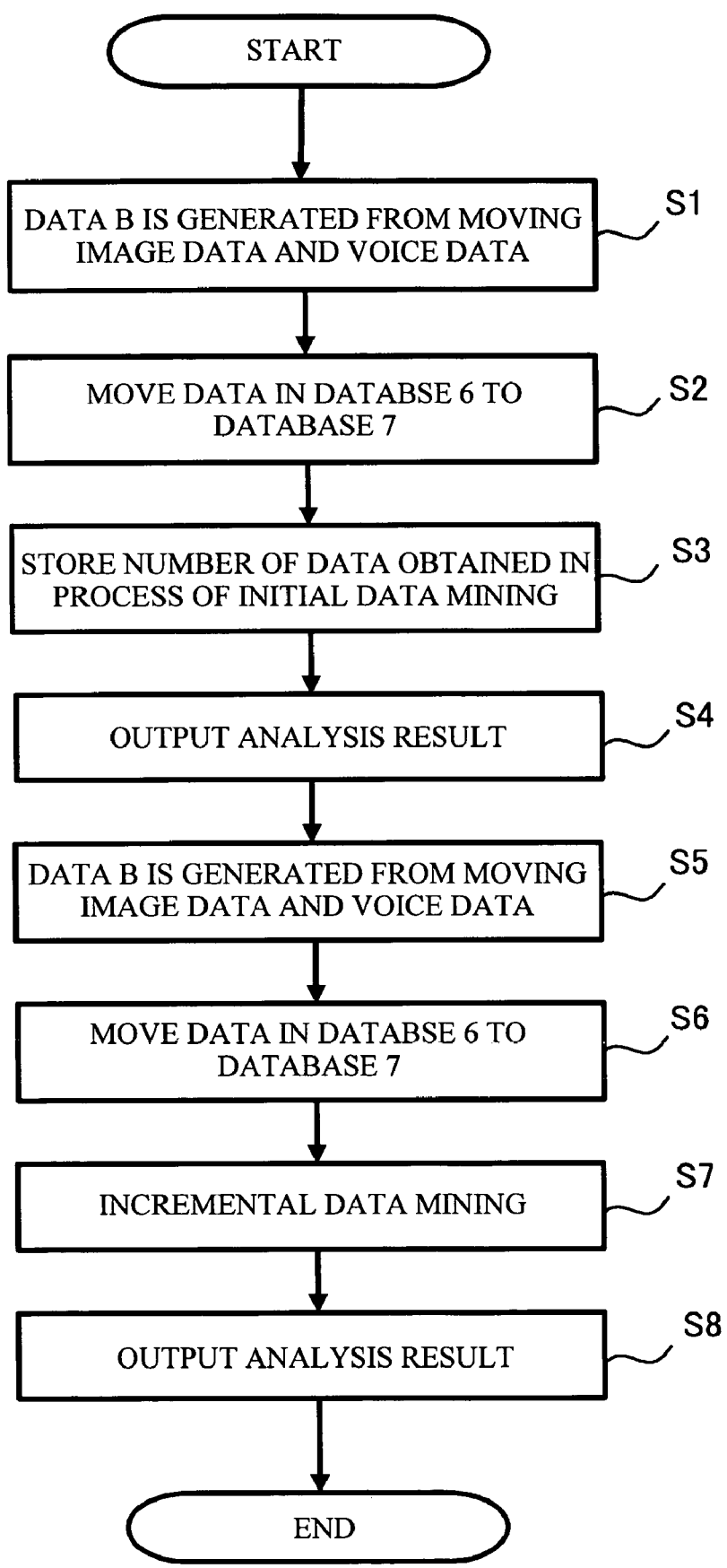
FIG. 4 is a flowchart showing a procedure of the information analysis apparatus embodying the invention.

A description will now be given of an operation of the information analysis apparatus 1 in accordance with the present embodiment. FIG. 4 is a flowchart showing a procedure of the information analysis apparatus 1 in accordance with the present embodiment. In step S1, the moving image data and the voice image data are input from the multiple cameras and multiple microphones. Then, the voice processing portion 5 executes the voice processing to specify, for example, a voice volume of a presenter with the voice data.

The image processing portion 4 executes the image processing to specify conducts of the presenter with the moving image data. In step S2, the data (the first data group) in the database 6 is moved to the database 7 at a given timing.

In step S3, the initial data mining portion 8 applies an existing data mining algorithm to the data A in the database 7, and stores the numbers of the data obtained in the process in the database 9. In step S4, the result outputting portion outputs the rule obtained in the initial data mining portion 8 as the analysis result. In step S5, the moving image data and the voice image data are input from the multiple cameras and multiple microphones. Then, the voice processing portion 5 executes the voice processing to specify, for example, the voice volume of a presenter with the voice data. The image processing portion 4 executes the image processing to specify the conducts of the presenter with the moving image data. In step S6, the data in the database 6 is moved to the database 7 at a given timing. The second data group is generated continuously and in synchronization after the first data group.

In step S7, the incremental data mining portion 10 conducts data mining of the data B (the second data group) and the intermediate result stored in the database 9 (the first data group) for the purpose of data mining of the data A and the data B. In step S8, the result outputting portion 11 outputs the rule obtained by the incremental data mining portion 10 as the analysis result. Repeating the steps S5 through S7 enables to obtain an always new analysis result with a smallest calculation amount.

The information analysis apparatus 1 is capable of promoting efficiency. For example, if there are 1000 data A stored, the technique of the present invention is capable of promoting 1000 times of efficiency as compared to a case where the conventional technique is simply applied every time the data is changed. Therefore, under the surroundings of the multiple data entered continuously and in syhchronization, the information analysis apparatus 1 of the present invention has the ability of obtaining the analysis result immediately for a substantially smallest analysis period. This makes it possible to provide the analysis method of efficient and incremental data mining, which is specialized for the data being input continuously and in synchronization from, for example, the multiple cameras and microphones.

Next, a description will be given of an application example of the information analysis apparatus 1 of the present invention. In this example, the information analysis apparatus 1 is applied to the data being generated on the conference for presentation delivery.

The moving image data and the voice data are input from the multiple cameras and the multiple microphones set in the conference room where the presentation is being delivered in the conference room. The voice processing portion 5 executes the voice processing to specify the voice volume of the presenter in the voice data. The image processing portion 4 executes the image processing to specify the conduct of the presenter's pointing a figure in the presentation document in the image data. Then, the data B is generated. Referring to FIG. 5, the data B is stored in the database 6. That is to say, the image processing portion 4 and the voice processing portion 5 are capable of executing processing in synchronization with each other in terms of time, and the results of image processing and the voice processing are recorded as attributes of Event 1 and Event 2. At this time, the databases 7 and 9 are empty.

Then, the data in the database 6 is moved to the database 7 at a given timing. FIG. 6 shows an example of data stored in the database 7. The database 7 stores the data corresponding to rule IDs 1001 through 1009 shown in FIG. 5 and the data corresponding to next rule IDs 2001 through 2006. At this time, the databases 6 and 9 are empty. The initial data mining portion 8 applies the existing data mining algorithm to, for example, a first half of the data A of the conference shown in FIG. 6, counts the numbers of data obtained in the process and stores in the database 9 a shown in FIG. 7. In this example, focusing on the attributes of the person ID, the Event 1, and the Event 2, the numbers of the respective data are stored with respect to whether the voice is normal or loud in the voice processing (Voice: normal or loud) and whether the image does not include an action or is pointing a figure in the image processing (Behavior: none or pointing a figure).

The result outputting portion 11 outputs the rules shown in FIG. 8 from the rules obtained in the initial data mining portion 8. However, the rules adopted are only cases where both the support and the confidence are high as described in Documents 2 through 4. For example, if the threshold values are set in such a manner that the support is 10 or higher and the confidence is 50 or higher, only underlined portions are output. With these rules, the user is able to speculate that, as to a person A, there are some sort of relationships between speaking loudly and pointing a figure in the first half of the conference.

Next, when the last half of the conference starts and there are the data newly input from the multiple cameras and multiple microphones, the voice processing portion 5 executes the voice processing and specifies the speaking volume of the presenter with the voice data. The image processing portion 4 executes the image processing and specifies the presenter's conduct of pointing the figure in the presentation document with the image data. The data B is therefore generated and stored in the table in the database 6. That is, as shown in FIG. 9, the data corresponding to rule IDs 2501 through 2503 are generated and stored in the database 6. FIG. 9 shows an example of the database 6 just after the last half of the conference starts. This example shows that the person A is pointing the figure while speaking loudly just after the last half of the conference starts. At this time, the database 7 still holds the situation shown in FIG. 6 and the database 9 still folds the situation shown in FIG. 7.

Then, referring to FIG. 10, the rule IDs 2501 through 2503 are added to the database 7, which is different from FIG. 6. The incremental data mining portion 10 conducts data mining of the data B (the second data group) and the intermediate result stored in the database 9 (the first data group) for the purpose of data mining of the data A and the data B. In other words, the incremental data mining portion 10 refers to the data stored in the database 9 (shown in FIG. 7) and the database 6 at this point, enabling to obtain the result as shown in FIG. 11. Here, the incremental data mining portion 10 does not have to refer to the database 7 (shown in FIG. 10), which includes huge amount of data.

FIG. 11 is an output example from the incremental data mining portion 10. With these rules, the user is able to speculate that, as to the person A, there are some sort of relationship between speaking loudly and pointing the figure in the first half of the conference. The content in the database 6 is deleted, the content of the database 9 (intermediate result) is updated from FIG. 7 to FIG. 12, and the above-mentioned steps S5 through S7 are repeated. It is therefore possible to obtain an always new analysis result (as shown in FIG. 11) with a smallest calculation amount, in the last half of the conference.

Conventionally, at the time of data mining, the expressions 1 and 2 had to be applied to the data A in FIG. 6, so that frequently appearing patterns might be extracted from all the combinations of the data with respect to all the attributes. In contrast, the present invention utilizes the intermediate result stored in advance in the database 9. The numbers are counted with newly input data B and the intermediate result stored in the database 9. This makes it possible to rapidly extract the association rules in the data A with the expressions 1 and 2, without referring to the data A.

In this manner, the present invention analyzes a group of data in timing synchronization with one another, and conducts the incremental data mining. This makes it possible to analyze the conference divided into the first half and the last half. In the last half, the analysis result is obtainable. Therefore, the user is able to analyze the rule that the loud speaking voice of the presenter and the conduct of pointing the figure are highly associated with each other, after the last half of the conference starts or after a given time has passed after the start of the conference. Accordingly, the user is able to listen to the presentation of the presenter efficiently, focusing particularly at the time when the presenter speaks loudly and points the figure in the last half.

A description will now be given of another application example of the information analysis apparatus 1. In this example, the information analysis apparatus 1 is applied to the data generated on a brain storming conference. The moving image data and the voice data are input from the multiple cameras and the multiple microphones installed in the conference room in which the brain storming conference is being held. Accordingly, the voice processing portion 5 executes the voice processing to specify laughter of a conference participant in the voice data. Also, the image processing portion 4 executes the image processing to specify nodding of the conference participant. The data B is generated in this manner and stored in the database 6. Then, the data B is copied to form the data A.

Here, the data in the first half of the conference is stored in the database 7 as the data A. The initial data mining portion 8 applies the existing data mining algorithm to the data A in the first half of the conference in order to conduct the initial data mining. The numbers of the data obtained in process of the data mining are stored in the database 9 as the intermediate result.

The conference continues and goes on to the last half of the conference. Whenever there are new inputs from the multiple cameras and multiple microphones, the voice processing portion 5 executes the voice processing to specify laughter of a conference participant with the voice data. Also, the image processing portion 4 executes the image processing to specify nodding of the conference participant. The data B is generated and stored in the table of the database 6. Then, the data B is copied to the database 7. The incremental data mining portion 10 rapidly conducts data mining of the data B (the second data group) and the intermediate result stored in the database 9 (the first data group) for the purpose of data mining of the data A and the data B.

Specifically, at the time of data mining, the expressions 1 and 2 are generally applied to the data A according to the conventional techniques. The frequently appearing pattern is extracted from among all the combinations of data in all the attributes. Then, the level of frequency of the laughter and nodding of the conference participant had to be calculated cyclopaedically with the combinations of all the conducts of all the participants. In contrast, the intermediate result that has been stored in the database 9 in advance is used according to the present invention so that the numbers of the data can be counted according to the item by adding the number of the newly input data B and that of the intermediate result (stored in the database 9). This makes it possible to extract the association rules of the data A with the expressions 1 and 2, without referring to the data A. For example, the number of the events of laughter and nodding of the conference participant stored in the database 9 are obtained. Continuously, the newly input events of the laughter and nodding are added, and then the expressions 1 and 2 are applied again. It is therefore possible to count the frequency of the events of laughter and nodding from among all the events on the conference. In this manner, the association rules of the laughter and nodding can be extracted immediately.

As described above, also on the brain storming conference, the tendency of the conference can be analyzed during the conference in accordance with the techniques of the present invention, and can be reviewed the first half of the conference efficiently in the last half of the conference or when a given time has passed since the start of the conference. In addition, it is possible to speculate that the laughter comes from the participant's joke with relief after the conclusion of the conference in the last half of the conference, by doing the incremental data mining of the group of data in timing synchronization according to the techniques of the present invention. In other words, it is possible to review the conclusion of the first half of the conference efficiently in the last half of the conference. If the conclusion of the conference can be analyzed in the last half of the conference and can be reviewed by the conference participants, a more sophisticated and efficient conference will be able to be held.

Next, a description will be given of further another application example of the information analysis apparatus 1 of the present invention. Here, the information analysis apparatus 1 of the present invention is applied to a case where two conferences of groups A and B are being held concurrently and different subjects are being discussed but having the same purpose. The purpose of the groups A and B is to investigate the related technology of a certain project. The subject of the group A is the technology in the software field, and that of the group B is the technology in the hardware field. Both groups respectively discuss the predetermined potential technologies.

The moving image data and the voice data are input from the multiple cameras and the multiple microphones installed in multiple conference rooms. Then, the voice processing portion 5 executes the voice processing to specify the ratio of heated discussion with soundless parts and speaking parts. The image processing portion 4 specifies the technology that has been discussed with the number of the documents shown on the projector. Then, the data B is generated and stored in the table of the database 6. The data B is copied to the database 7. The incremental data mining portion 10 conducts data mining of the data B (the second data group) and the intermediate result stored in the database 9 (the first data group) for the purpose of data mining of the data A and the data B.

Specifically, the expressions 1 and 2 are applied to the data A to calculate the frequencies of all the events that simultaneously happen on the conference and extract the frequently appearing patterns as the rules, according to the conventional techniques. In contrast, the incremental data mining portion 10 counts only the difference between the data B shown in FIG. 3 and the number of times of the respective events that have been stored as the intermediate result in advance (in the database 9). This makes it possible to obtain the analysis result quickly at an arbitrary point of time on the conference as the rule of the frequently appearing pattern. It is therefore possible to substantially minimize the analysis period.

As described, when the conferences of the groups A and B are held concurrently and the different subjects having the same purpose are discussed, one group is capable of obtaining not only their own analysis result but also those of the both groups. Therefore, the group A comes to know the software technology as well as the hardware technology discussed by the group B (the data analysis in synchronization with the number of the technologies discussed with the number of the documents shown on the projector and the ratio of heated discussion in soundless parts and speaking parts). The group A is able to go on to the conference efficiently, while taking into consideration of the relationship with the discussion of the group B. In this manner, the analysis and comparison of multiple conferences being held simultaneously with the use of the present invention can promote the efficiency of the conferences after the analysis and comparison.

A huge amount of calculation is generally necessary for continuously conducting data mining of the record of the multiple conferences. However, according to the present invention, the incremental data mining completes the analysis from the start to an arbitrary point of time, at the aforementioned arbitrary point of time, substantially enabling to minimize the analysis period of time.

On the information analysis apparatus in which multiple data are concurrently input in synchronization and the data is being generated continuously, the rules are generated incrementally in accordance with the present embodiment. It is therefore possible to provide the information analysis apparatus that operates efficiently by combining the effectiveness of the integration of the inputs from multiple cameras and multiple microphones and that of the incremental data mining, in order to analyze the moving images being continuously recorded by the multiple cameras.

An information analysis method of the present invention is realized with a CPU (Central Processing Unit), ROM (Read Only Memory), RAM (Random Access Memory), and the like, by installing a program from a portable memory device or a storage device such as a hard disc device, CD-ROM, DVD, or a flexible disc or downloading the program through a communications line. Then the steps of program are executed as the CPU operates the program.

On an information analysis program of the present invention, steps are executed on a computer, the steps including conducting data mining of a first data group and counting numbers of data obtained in process of the data mining of the first data group, and conducting the data mining of a second data group, counting the numbers of data obtained in process of the data mining of the second data group, and further conducting the data mining of the first and second data groups, on the basis of the numbers of data obtained by the first and second mining portions. The second data group may be generated continuously after the first data group.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-040667 filed on Feb. 17, 2005 including specification, claims, drawings, and abstract is incorporated herein by reference in its entirety.

What is claimed is:

1. An information analysis apparatus comprising a processor, a memory, and first and second data mining portions,
the first mining portion extracting association rules of data in a first data group by conducting data mining of the first data group and counting the number of data obtained in process of the data mining of the first data group, the second mining portion extracting association rules of data in a second data group by conducting the data mining of the second data group, counting the number of data obtained in process of the data mining of the second data group, and further extracting association rules of data in the first and second data groups by conducting the data mining of the first and second data groups, on the basis of the number of data obtained by the first and second mining portions, the second data group being generated continuously after the first data group, and further comprising an information processing portion that generates at least one of identification information of a person related to an event, coordinates of the person, a time when the event happens, and a content of the event, as the first and second data groups, with the use of a technique of image processing or voice processing, based on moving image data and voice data.

2. The information analysis apparatus according to claim 1, further comprising a database that stores the number of data as an intermediate result.

3. The information analysis apparatus according to claim 1, further comprising two databases that separately store the first and second data groups.

4. The information analysis apparatus according to claim 1, further comprising an outputting portion that outputs an analysis result of the second mining portion.

5. The information analysis apparatus according to claim 1, wherein the counting the number of data includes counting the number of every data item and the number of combinations of the data items appearing in the first data group.

6. The information analysis apparatus according to claim 1, further comprising an information processing portion that generates the first and second data groups on the basis of multiple data in synchronization.

7. The information analysis apparatus according to claim 1, further comprising a database that stores the identification information of the person related to the event, the coordinates of the person, the time when the event happens, and the content of the event.

8. An information analysis method comprising:
extracting association rules of data in a first data group by conducting data mining of the first data group and counting the number of data obtained in process of the data mining of the first data group;
extracting association rules of data in a second data group by conducting the data mining of the second data group, counting the number of data obtained in process of the data mining of the second data group, and further extracting association rules of data in the first and second data groups by conducting the data mining of the first and second data groups, on the basis of the number of data obtained by the first and second mining portions; and
generating at least one of identification information of a person related to an event, coordinates of the person, a time when the event happens, and a content of the event, as the first and second data groups, with the use of a technique of image processing or voice processing, based on moving image data and voice data,
wherein the second data group is generated continuously after the first data group.

9. The information analysis method according to claim 8, further comprising generating the first and second data groups on the basis of multiple data in synchronization.

10. The information analysis method according to claim 8, wherein the counting the number of data includes counting the number of every data item and the number of combinations of the data items appearing in the first data group.

11. A storage medium readable by a computer, the storage medium storing a program of instructions executable by the computer to perform a function for data mining, the function comprising:
extracting association rules of data in a first data group by conducting data mining of the first data group and counting the number of data obtained in process of the data mining of the first data group;
extracting association rules of data in a second data group by conducting the data mining of the second data group, counting the number of data obtained in process of the data mining of the second data group, and further extracting association rules of data in the first and second data groups by conducting the data mining of the first and second data groups, on the basis of the number of data obtained by the first and second mining portions; and
generating at least one of identification information of a person related to an event, coordinates of the person, a time when the event happens, and a content of the event, as the first and second data groups, with the use of a technique of image processing or voice processing, based on moving image data and voice data,
wherein the second data group is generated continuously after the first data group.

12. An information analysis apparatus comprising:
a processor;
a memory;
a first mining portion that extracts association rules of data in a first data group by conducting data mining of a plurality of data in the first data group and counting the number of same data items appearing in the first data group and the number of combinations of appearing data items;
a second mining portion that extracts association rules of data in a second data group by conducting the data mining of a plurality of data in the first data group and the second data group based on a plurality of data in the second data group and the number counted by the first mining portion; and
an information processing portion that generates at least one of identification information of a person related to an event, coordinates of the person, a time when the event happens, and a content of the event, as the first and second data groups, with the use of a technique of image processing or voice processing, based on moving image data and voice data,
the second data group being generated continuously after the first data group.

13. The information analysis apparatus according to claim 12, wherein the second mining portion calculates the number of same data items appearing in the first data group and the second data group and the number of combinations of appearing data items based on the plurality of data in the second data group and the number counted by the first mining portion.

14. The information analysis apparatus according to claim 13, wherein the second mining portion conducts the data mining of a plurality of data in the first data group, the second data group and a third data group based on a plurality of data in the third data group and the number calculated by the second mining portion,
the third data group being generated continuously after the second data group.

15. An information analysis method comprising:

extracting association rules of data in a first data group by conducting data mining of a plurality of data in the first data group;

counting the number of same data items appearing in the first data group and the number of combinations of appearing data items; extracting association rules of data in a second data group by conducting the data mining of a plurality of data in the first data group and the second data group based on a plurality of data in the second data group and the number counted by the first mining portion;

generating at least one of identification information of a person related to an event, coordinates of the person, a time when the event happens, and a content of the event, as the first and second data groups, with the use of a technique of image processing or voice processing, based on moving image data and voice data, the second data group being generated continuously after the first data group.

16. A computer readable medium storing a program causing a computer to execute a process for information analysis, the process comprising:

extracting association rules of data in a first data group by conducting data mining of a plurality of data in the first data group;

counting the number of same data items appearing in the first data group and the number of combinations of appearing data items;

extracting association rules of data in a second data group by conducting the data mining of a plurality of data in the first data group and the second data group based on a plurality of data in the second data group and the number counted by the first mining portion; and generating at least one of identification information of a person related to an event, coordinates of the person, a time when the event happens, and a content of the event, as the first and second data groups, with the use of a technique of image processing or voice processing, based on moving image data and voice data, the second data group being generated continuously after the first data group.

17. The information analysis apparatus according to claim 1, wherein the data mining comprises extracting knowledge from a database and finding unexpected patterns in data.

18. The information analysis apparatus according to claim 12, wherein the data mining comprises extracting knowledge from a database and finding unexpected patterns in data.

* * * * *